United States Patent [19]

Kitagawa et al.

[11] Patent Number: 4,631,102
[45] Date of Patent: Dec. 23, 1986

[54] METHOD OF MANUFACTURING HEAT EXCHANGE MAT

[75] Inventors: Yoshiaki Kitagawa, Osaka; Hideo Iwata, Hirakata, both of Japan

[73] Assignee: Matsushita Electric Works, Ltd., Osaka, Japan

[21] Appl. No.: 709,413

[22] Filed: Mar. 7, 1985

[30] Foreign Application Priority Data

May 15, 1984 [JP] Japan .................................. 59-98401

[51] Int. Cl.⁴ .............................................. C09J 5/02
[52] U.S. Cl. ..................... 156/210; 156/216; 156/307.3; 156/333
[58] Field of Search .................. 156/307.1, 307.3, 311, 156/322, 182, 210, 212, 213, 216, 312, 333; 165/46, 48 S, 48 R, 49, DIG. 8, 170

[56] References Cited

U.S. PATENT DOCUMENTS

| | | | |
|---|---|---|---|
| 3,962,511 | 6/1976 | Foti | 156/307.3 |
| 4,230,175 | 10/1980 | Disselbeck et al. | 165/46 |
| 4,416,717 | 11/1983 | Galasso et al. | 156/307.3 |
| 4,525,234 | 6/1985 | Herold et al. | 156/332 |

*Primary Examiner*—Michael Ball
*Attorney, Agent, or Firm*—Burns, Doane, Swecker & Mathis

[57] ABSTRACT

A method of manufacturing heat exchange mat comprises a first heating step of a mat member for semi-gelatinizing a pasty resin adhesive in said mat member as interposed between a surface sheet and a textile insert on both surfaces of a hollow member including a heat exchanging element of the mat member so as to preliminarily bonding said sheet and insert, and a second heating step for securing a seal member to the peripheral edges of the mat member and simultaneously fully gelatinizing said resin adhesive, whereby the required manufacturing time can be shortened to a large extent.

6 Claims, 9 Drawing Figures

METHOD OF MANUFACTURING HEAT EXCHANGE MAT

BACKGROUND OF THE INVENTION

This invention relates to a method of manufacturing mat-shaped heat exchangers employing hot water or the like heat exchanging fluid caused to flow therethrough and, more specifically, to a simplified method of manufacturing a heat exchange mat formed into a flat sheet shape for laying on a floor so as to achieve, for example, floor surface heating with hot water circulated throughout the interior of the mat.

One of the heat exchange mats of the kind referred to of the flat sheet shape and flexible to be laid on the flat floor has been disclosed in, for example, U.S. Pat. No. 4,230,175, according to which the mat can be effectively applied to solar heat utilizing devices. In recent years, further, the flat and flexible heat exchange mats have been widely developed for the purpose of accomplishing the heat exchange with a house room atmosphere in an expanse of room floor. A typical one of such heat exchange mats comprises, as shown in FIG. 1, a hollow member 10 including a heat exchange element 1 of wavy warp and linear weft filaments 2 and 3 of a metal or plastic material and knitted with each other substantially perpendicularly and such an insert 4 as a textile disposed on each of top and bottom surfaces of the element 1, and a surface sheet 5 of a polyvinyl chloride or the like and bonded onto each surface of the hollow member 10. In the final product, as shown in FIG. 2, a pair of thus formed heat exchange mats 6a and 6b of desired dimensions are coupled edgewise to each other preferably through a plastic-made partition 7 shorter than the coupling edge of the mats, a plastic-made seal member 8 is secured to the peripheral edges of the coupled mats while leaving open positions at both ends of the partition 7. A plastic-made coupling member 9a for feeding and discharging the heat exchanging fluid into and out of the interior of the both mats 6a and 6b is secured to one of the open portions. A further plastic-made coupling member 9b for communicating the interior of the mats with each other is secured to the other open portion, so that the heat exchanging fluid can flow throughout the interior of the mats substantially as indicated by arrows in the drawing.

In manufacturing such heat exchange mat as above, further, the surface sheet 5 is laminated onto the textile insert 4 on each surface of the hollow member 10 including the heat exchange element 1, preferably with a layer of an adhesive in a sol state of a polyvinyl chloride resin or the like interposed between them, and this adhesive layer is fully gelatinized through a heating step so as to tightly join the sheet and insert, while the peripheral seal member thereafter secured to the lamination is heated by means of a high frequency welder or the like to be sufficialy fluid-tightly joined to the surface sheets of the lamination. In the manufacture of the heat exchange mat through such steps as above, however, there has been involved a problem that the manufacturing costs are caused to be high because a relatively long time is required for fully gelatinizing the adhesive layer and still the fluid-tight joining of the seal member to the surface sheet is time-consuming enough for rendering the entire manufacturing workability to be remarkably low.

DISCLOSURE OF THE INVENTION

It is a primary object of the present invention, therefore, to eliminate such problem involved in the known manufacturing method for the heat exchange mat as above, and to provide an improved heat exchange mat manufacturing method of which the required working time is remarkably shortened so that the manufacturing workability can be improved to a large extent and thus the manufacturing costs can be well lowered.

According to the method of the present invention for manufacturing the heat exchange mat, this object can be well attained by having a pasty adhesive layer initially semi-gelatinized as interposed between the surface sheet and the hollow member for preliminarily bonding the surface sheets to the hollow member and allowing further manufacturing works to be soon continued, and having the adhesive layer fully gelatinized at following fluid-tight joining step of the surface sheet and seal member.

Other objects and advantages of the present invention shall become clear by references to following disclosure thereof detailed with reference to embodiments shown in accompanying drawings.

Figure 1:
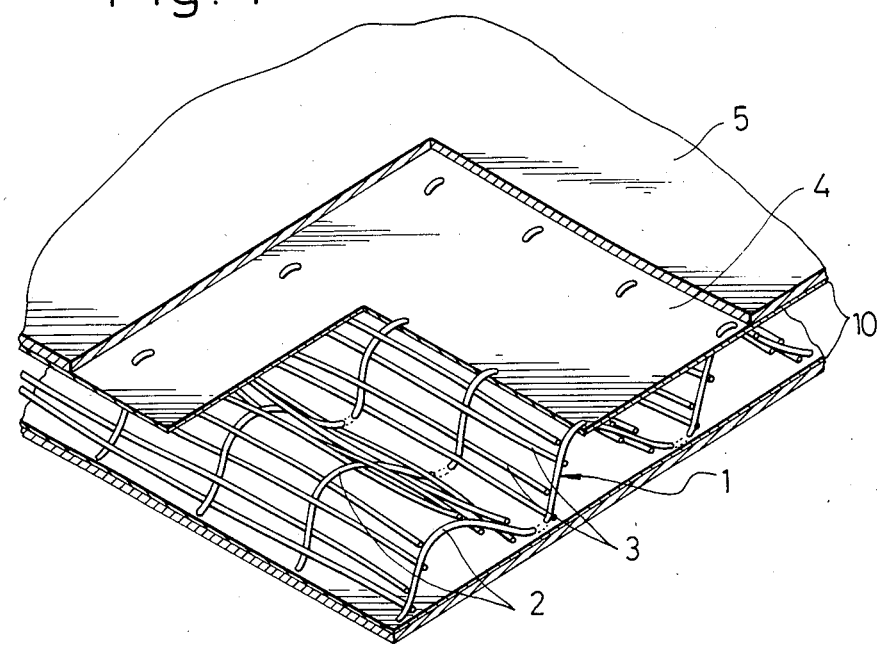
FIG. 1 is a fragmental perspective view with certain parts removed for showing interior structure of a heat exchange mat to which the present invention relates.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

According to a remarkable feature of the present invention, the method can be shortened in time required for bonding the respective members forming such heat exchange element as has been disclosed with reference to FIG. 1, for preparing the mat members. That is, in the method of the present invention, preferably, a hollow member 10 is initially prepared with knitted warp and weft filaments 2 and 3 sandwiched between two textile inserts 4. A surface sheet 5 is placed on each of the two inserts 4, that is, on both surfaces of the hollow member 10 with a layer of such adhesive as a paste resin interposed between the surface sheets 5 and the hollow member 10. The pasty adhesive is subjected to a semi-gelatinization through a first heating step of a relatively short time for preliminarily bonding the sheets 5 and member 10 and, thereafter, the adhesive being semi-gelatinized is fully gelatinized through a second heating step concurrently with the securing of the sealing member to the peripheral edges of the mat members. In the present instance, the "semi-gelatinization" means that the viscosity of dispersion type polyvinyl chloride (PVC) resin used as the pasty adhesive is increased as it absorbs the plasticizer which is a dispersion medium with the temperature rise so that the hollow member and surface sheets are joined to an extent in which the mat member formed with them can be properly handled or even subjected to a shearing work in the normal temperature atmosphere.

Figure 3:
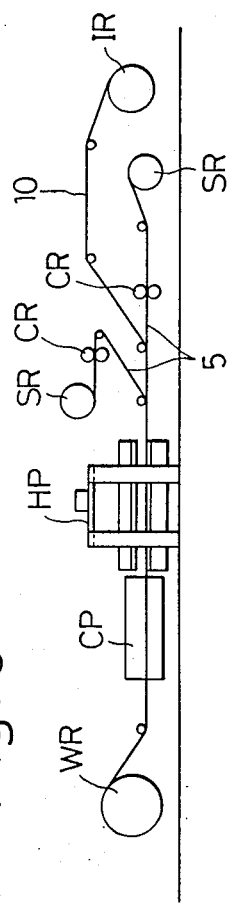
FIG. 3 is a schematic explanatory view for an embodiment of a semi-gelatinizing step for the adhesive layer in the method of manufacturing the heat exchange mat according to the present invention.

Referring more specifically to the above with reference to FIG. 3 showing the step of semi-gelatinizing the adhesive between the hollow member 10 and the surface sheets 5 with a heat press, a strip of the hollow member 10 is paid out of a hollow-member roll IR, and two surface sheet strips 5 are also paid out of surface-sheet rolls SR, during which such pasty resin adhesive as pasty PVC is applied by means of two pairs of coating rollers CR onto the surface sheet strips 5 on their side to be joined with the hollow member 10 before these strips are laminated. Laminated strips are then passed through a heating station comprising a heat press HP and further through a cooling station comprising a cold press CP. In the heating station, the strips laminated were subjected to a pressing for about 1 minute at a temperature of about 170° C. and, in the cooling station, they were further pressed for about 1 minute at the normal temperature, whereby the adhesive could be properly semi-gelatinized for sufficiently preliminarily joining the laminated strips. The laminate of thus preliminarily joined strips with the semi-gelatinized adhesive is wound onto a winding roll WR so as to be prepared to a next step of the method.

Figure 4:
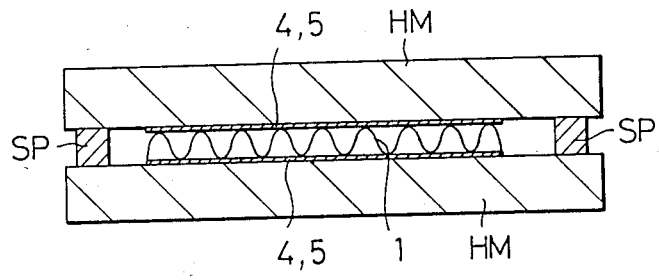

The first heating step as above for the semi-gelatinization of the adhesive can be performed alternatively in such a manner as shown in FIG. 4, in which the laminate with the adhesive layer interposed and made in a desired size already is subjected to a pressing work as disposed between a pair of heat press members HM of a heat press opposed through spacers SP defining a proper height to which the laminate is to be pressed, under the same conditions as those for the heat station HP in FIG. 3. The step of this manner is suitable for a mass and economical production of the mat members.

Figure 5:
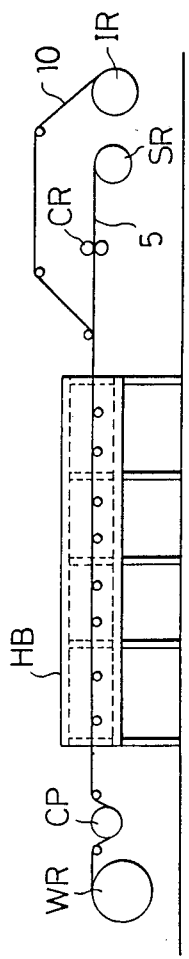
FIGS. 4 and 5 are schematic explanatory views for other embodiments of the semi-gelatinizing step according to the present invention.

Referring to FIG. 5, there is shown another example of the step for semi-gelatinizing the adhesive, in which the laminate is passed simply through a heating bath. In this example, a single surface 5 is laminated onto the hollow member 10 in the same manner as in the case of FIG. 3, the laminate is then heated at a heat station comprising the heating bath HB for 2 minutes at 170° C., the heated laminate is wound, as passed through cold rolls CP of the normal temperature, onto a winding roll WR. With this arrangement of the first heating step, too, the same semi-gelatinization as in the case of FIG. 3 can be attained for the preliminary bonding of the hollow member and surface sheet, to be prepared for the next step.

Figure 2:
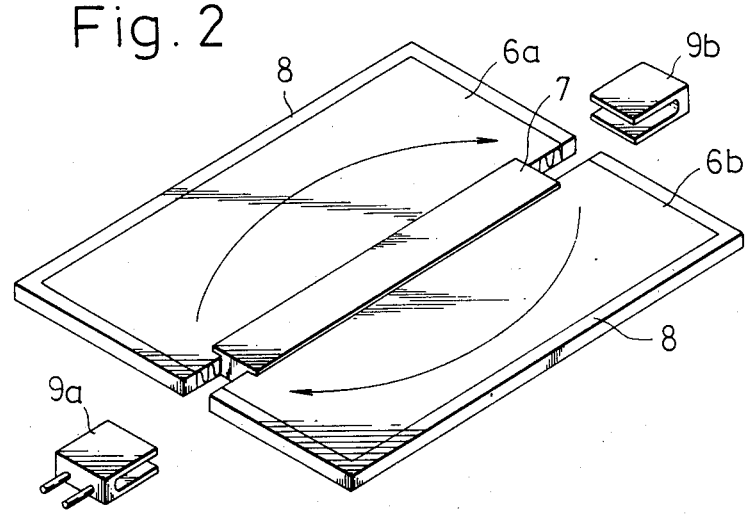
FIG. 2 is a perspective view of the heat exchange mat of FIG. 1 with some constituent members disassembled.
Figure 6A:
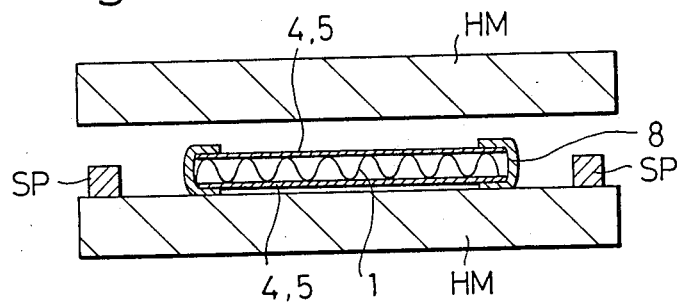
FIGS. 6A and 6B are similar schematic views for explaining a step of gelatinizing the adhesive layer in the method according to the present invention.
Figure 6B:
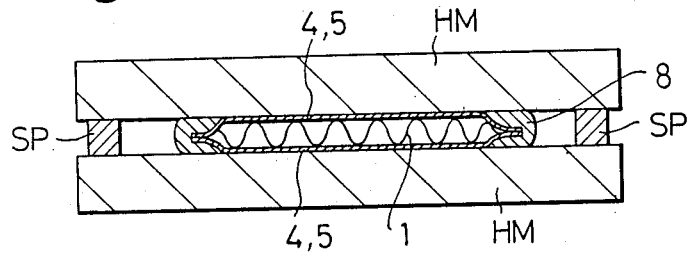

The laminate produced into a continuous strip as in the case of the example of FIG. 3 or 5 is then cut into pieces for a desired size which forming preliminary mat members and, as required, the seal member is secured to the peripheral edges of each of the preliminary mat members, while the laminate in the case of the example of FIG. 4 is provided as it is with the seal member. The preliminary mat members are then subjected to a second heating step, as placed between a pair of heat press members HM opposed through spacers SP defining the required height for the mat to be manufactured, as shown in FIG. 6A, the upper heat press member HM is lowered to press the preliminary mat member under a heat condition of a properly high temperature for fully gelatinizing the adhesive in the semi-gelatinized state as interposed between the surface sheets and the hollow member, as shown in FIG. 6B, and the mat members effectively utilizable for such heat exchange mat as in FIG. 2 are obtained. Here, the "full gelatinization" of the adhesive should be that the viscosity of the dispersion type PVC resin which absorbs the plasticizer as the temperature further rises is once abruptly increased and is thereafter decreased to fully lose the molten state.

In preparing the preliminary mat members, the thickness of the preliminary mat member is made larger than the height of the spacer SP preferably by a total thickness of the insert 4 and surface sheet 5 employed for the mat member. When the seal member is secured to the preliminary mat member, therefore, the preliminary mat member will lose this total thickness in the heat press and the seal member fitted to the peripheral edges of the mat member will be correspondingly compressed. Through the second heating step, therefore, it is possible to attain the full gelatinization of the adhesive and to simultaneously secure the seal member to the both surface sheets of the mat member sufficiently fluid tightly. The thickness of the mat members thus produced will be generally in a range of 3 to 10 mm.

In the above described method of manufacturing the heat exchange mat, the textile insert 4 of the hollow member 10, surface sheet 5, seal member 8 and resinous pasty adhesive may be of materials respectively in one of such combinations as in the following Table I:

TABLE I

| Comb. | Insert | Surface Sheet | Seal Member | Adhesive |
|---|---|---|---|---|
| 1 | Plain weave fabric of 1000 de. polyester multifilaments (80 fil/in) | PVC sheet | Extruded PVC product | PVC adhesive (NBR)* |
| 2 | Plain weave fabric of 1000 de. polyester multifilaments (80 fil/in) | Latex (NBR, SBR, EPDM)* | Extruded rubber product (NBR, SBR, EPDM) | Latex (NBR, SBR, EPDM) |
| 3 | Plain weave fabric of 1000 de. polyester multifilaments (80 fil/in) | Rubber sheet (semi-vulcanized or nonvulcanized) | Extruded rubber product (semi-vulcanized) | Latex (NBR, SBR, EPDM) |
| 4 | Plain weave fabric of 1000 de. polyester multifilaments | Epoxy sheet | Extruded rubber or PVC product | Epoxy resin adhesive |

TABLE I-continued

| Comb. | Insert | Surface Sheet | Seal Member | Adhesive |
|---|---|---|---|---|
|  |  | (80 fil/in) |  |  |

*Wherein, "NBR" is acrylonitrile-butadiene rubber, "SBR" is styrene-butadiene rubber, and "EPDM" is ethylene-propylene-diene terpolymer.

It has been found through a following example of experiment that the preliminary mat member in which the pasty adhesive for joining the surface sheet to the insert of hollow member is semi-gelatinized through the first heating step as has been described is provided with a sufficient anti-peel-off strength for being subjected to such subsequent steps as the cutting and the like.

EXAMPLE I

A first group of samples of the mat member respectively 25 mm wide and 100 mm long were prepared with the materials in Combination 1 of the above Table I, that is, the insert of the plain weave fabric on the both sides of the hollow member and the surface sheet of PVC joined to the insert with the adhesive of PVC interposed between them. For the PVC adhesive, its composition employed here was

- 100 parts of a PVC resin, a copolymer of vinyl chloride and vinyl acetate having the mean degree of copolymerization of 1750 (a product of Japanese firm Nippon Zeon K.K., under the trade name "Zeon 37J"),
- 60 parts of a plasticizer, dioctyl phthalate (a product of Japanese firm Kao Sekken K.K., under the trade name "DOP"),
- 5 parts of an adhesion assistant, dibutyl phthalate solution having components of isocyanurate type (a product of Japanese firm ICI Japan K.K., under the trade name "Vulcabond VP"), and
- 3 parts of an epoxy resin stabilizer (a product of Japanese firm Kyodo Yakuhin K.K., under the trade name of "KH308B").

The PVC adhesive was then heated for the semi-gelatinization at a heating temperature of substantially 170° C. (338° F.), and test samples of a variety of heating times respectively different by 1 minute added were obtained. With respect to each of such test samples, a tensile force at a rate of 50 mm/min. was applied simultaneously to each of the hollow member and surface sheet by means of a proper jig for separating them in opposite directions substantially of 180 degrees, and a required force for peeling them off per 1 inch was measured.

A second group of test samples were further prepared with the PVC adhesive of the same composition only except a change of the 5 parts of the adhesion assistant to 10 parts and likewise semi-gelatinized, and the required peel-off force was measured with respect to each of these test samples under the same conditions as above.

Figure 7:
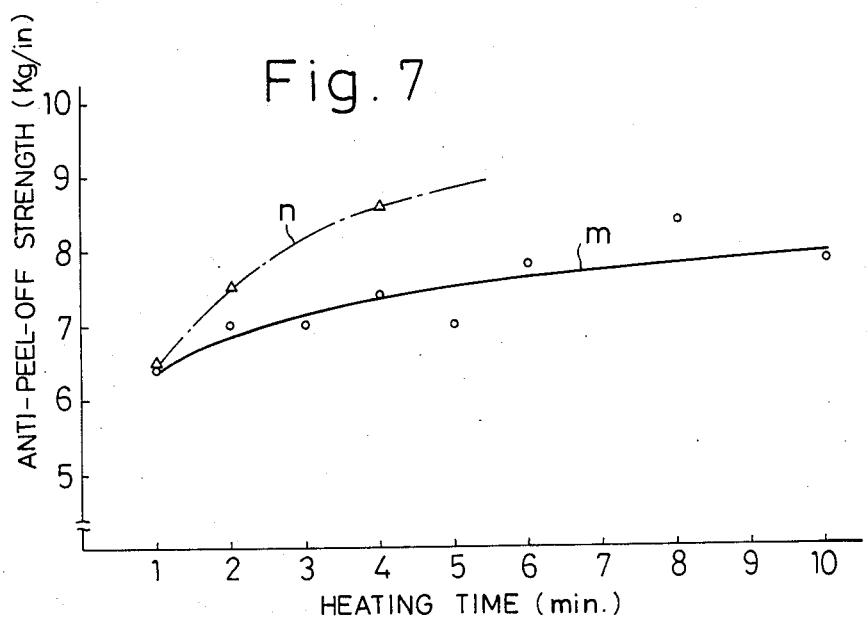
FIG. 7 is a diagram showing the relationship of anti-peel-off strength between the surface sheet and the hollow member of the mat with respect to heating time for semi-gelatinizing the adhesive layer.

FIG. 7 shows the resultant measurements, in which a solid-line curve "m" represents varying anti-peel-off strength depending on the varying heating time for the semi-gelatinization in the case of the first group of the samples of the 5 parts adhesion assistant, and a chain-line curve "n" represents the similar anti-peel-off strength in the case the second group of the samples of the 10 parts adhesion assistant.

Presenting the above measurements in tables, they will be as follows, in which it should be readily appreciated that Table II is for the first group of the samples of the 5 parts adhesion assistant while Table III is for the second group of the 10 parts adhesion assistant, respectively in the composition of the PVC adhesive of Example I.

TABLE II

| Heating Time (min.) | 1 | 2 | 3 | 4 | 5 | 6 | 7 | 8 |
|---|---|---|---|---|---|---|---|---|
| Anti-Peel-Off Strength (kg/in) | 6.4 | 7.0 | 7.0 | 7.4 | 7.0 | 7.8 | 8.4 | 7.8 |

TABLE III

| Heating Time (min.) | 1 | 2 | 3 | 4 |
|---|---|---|---|---|
| Anti-Peel-Off Strength (kg/in) | 6.5 | 7.5 | 8.6 | # |

- The PVC surface sheet was damaged to disenable the measurement.

It is seen from the measurements that the preliminary mat member having the anti-peel-off strength higher than 6.0 kg/in with the semi-gelatinized adhesive joining the surface sheet to the hollow member allows the subsequent treating steps to be fully performed without any trouble.

A further experimental example as will be described in the following has revealed that the anti-peel-off strength of the preliminary mat members can be maintained to be higher than 6.0 kg/in, even when the resin adhesive in the members is fully gelatinized through a later heating step after being left to stand as semi-gelatinized for a relatively long time. This fact that the anti-peel-off strength of the preliminary mat members is not deteriorated by the full gelatinizing heating of the semi-gelatinized resin adhesive after a long shelf time, should be regarded very important. That is, in the mass production line of the heat exchange mat, it is natural that even in the normal course of the line the preliminary mat members have to be left to stand for a relatively long time just as processed through the first heating step for the semi-gelatinization of the pasty adhesive, because the mat members are to be thereafter cut into the desired size and then to be provided with the peripheral seal members and so on. It will be appreciated, however, that the retention over a long period of the resin adhesive just as semi-gelatinized according to the present invention gives no substantial influence on the properties of the heat exchange mat in its final product state. Yet, it has been uncovered that the surface sheet preliminarily joined to the hollow member with the resin adhesive semi-gelatinized through the first heating step is kept to be more easily deformable than in the case where the adhesive is fully gelatinized, so as to allow the seal member to be secured thereto easily and reliably, or in other words the retention of the adhesive in its semi-gelatinized state during the intermediate processing steps is also useful in maintaining a higher mountability of the seal member.

EXAMPLE II

A first group of samples of the mat member were prepared exactly in the same dimensions and with the same materials and adhesive-composition as in the case of Example I. After the first heating step for the semi-gelatinization of the PVC adhesive at the heating temperature substantially of 170° C. (338° F.) for 1 minute, the samples were left to stand in the atmosphere of a room temperature of about 20° C. (68° F.). Upon different shelf times elapsed, the respective samples were subjected to a second heating step for the full gelatinization of the PVC adhesive at the heating temperature substantially of 170° C. (338° F.) for 3 minutes, and thereafter to the measurement of the anti-peel-off strength per inch by means of the jig for separating the surface sheet and hollow member from each other in the opposite directions substantially of 180 degrees, with the tensile force applied to each of them at the rate of 50 mm/min.

A second group of samples of the mat member were prepared exactly in the same manner as in the above, only except that the first 1 minute heating step for semi-gelatinizing the PVC adhesive was extended to 2 minutes, and their anti-peel-off strength was measured under exactly the same conditions, after the same second heating step for the full gelatinization.

Figure 8:
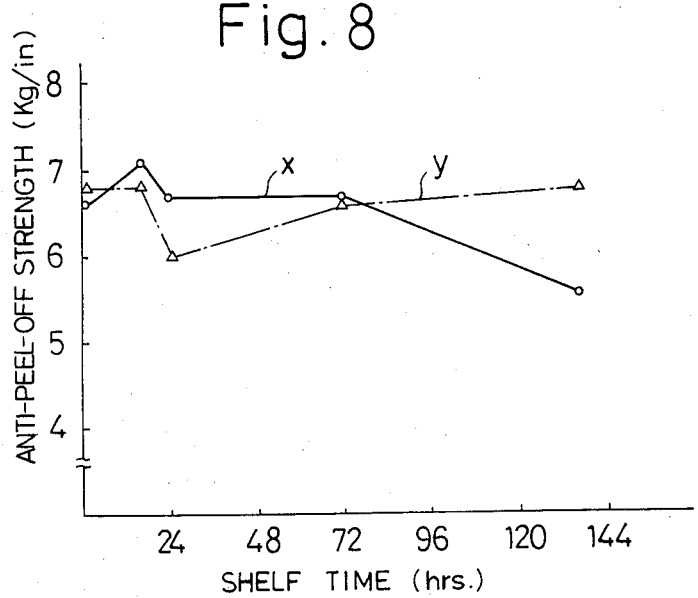
FIG. 8 is a diagram showing variations in the anti-peel-off strength when the adhesive layer is fully gelatinized after predetermined shelf time of the mat following the semi-gelatinizing heating step.

Resultant measurements are shown in FIG. 8, in which a solid-line curve "x" denotes the anti-peel-off strength of the first group of the samples of the 1 minute semi-gelatinizing heating, and a chain-line curve "y" denotes the similar strength of the second group materials of the 2 minute semi-gelatinizing heating.

The measurements are also shown in the following Tables IV and V, the former of which is of the curve "x" for the first group samples and the latter of which is of the curve "y" for the second group samples:

TABLE IV

| Shelf Time (hrs.) | 0 | 24 | 72 |
|---|---|---|---|
| Anti-Peel-Off Strength (kg/in) | 6.6 | 6.7 | 6.7 |

TABLE V

| Shelf Time (hrs.) | 0 | 24 | 72 |
|---|---|---|---|
| Anti-Peel-Off Strength (kg/in) | 6.8 | 6.0 | 6.6 |

According to the method of the present invention as has been disclosed, the pasty adhesive is only semi-gelatinized at the first heating step, and the full gelatinization and simultaneous securing of the seal member can be performed at the second heating step, so that the required manufacturing time for the mat members can be shortened to a remarkable extent. It should be readily appreciated by those skilled in the art that, in practice, the manufacturing time according to the method of the present invention can be reduced substantially to be about ⅓ of that required in known methods for manufacturing the mat members, whereby the manufacturing cost can be lowered to a larger extent.

It should also appreciated that the mat members thus manufactured can be effectively utilized for making the heat exchange mat as shown in FIG. 2.

What we claim as our invention is:

1. A method of manufacturing a heat exchange mat comprising the steps of:
   forming a hollow member by providing a textile insert on both surfaces of a heat exchanging element including wavy warp and linear weft filaments knitted substantially at right angles with each other,
   disposing a surface sheet of polyvinyl chloride over each of said textile inserts on both sides of said hollow member, with a pasty polyvinyl chloride resin adhesive interposed between each said surface sheet and its associated insert,
   forming a preliminary heat exchange mat member by subjecting said hollow member with said surface sheets to a first heating step at about 170° C. for about 1 to 2 minutes for semi-gelatinizing said pasty resin adhesive, and thereafter
   fully gelatinizing said pasty resin adhesive by subjecting said preliminary heat exchange mat member to a second heating step at about 170° C. for about 3 minutes and under a pressure while maintaining a required height of said hollow member, wherein said second heating step includes a step of securing a peripheral sealing member to peripheral edges of said preliminary heat exchange mat member.

2. A method according to claim 1, wherein said first and second heating steps are performed by means of a heat press with a spacer disposed between an opposed pair of heat press members of said press for defining said height of said hollow member.

3. A method according to claim 2, wherein said first heating step is followed by a cooling step of passing said preliminary heat exchange mat member and said spacer through a cold press at atmospheric temperature for about 1 minute.

4. A method according to claim 1, wherein said first heating step is performed by passing said preliminary heat exchange mat member through a heating bath for about 2 minutes.

5. A method according to claim 4, wherein said first heating step is followed by a cooling step of passing said preliminary heat exchange mat member through a pair of cold rolls of the normal temperature.

6. A method according to claim 1, wherein said pasty adhesive contains at least 5 parts of an adhesion assistant.

* * * * *